July 29, 1969 TSUNEHISA OHIRA 3,458,158

DEVICE FOR DETACHABLY MOUNTING A TAPE CARTRIDGE FOR USE IN A TAPE RECORDER

Filed Dec. 4, 1967 5 Sheets-Sheet 1

INVENTOR

TSUNEHISA OHIRA

BY Stevens, Davis, Miller & Mosher

ATTORNEYS

July 29, 1969 TSUNEHISA OHIRA 3,458,158

DEVICE FOR DETACHABLY MOUNTING A TAPE CARTRIDGE FOR USE IN A TAPE RECORDER

Filed Dec. 4, 1967 5 Sheets-Sheet 2

INVENTOR

TSUNEHISA OHIRA

BY Stevens, Davis, Miller & Mosher

ATTORNEYS

INVENTOR

TSUNEHISA OHIRA

BY Stevens, Davis, Miller & Mosher

ATTORNEYS

July 29, 1969 TSUNEHISA OHIRA 3,458,158

DEVICE FOR DETACHABLY MOUNTING A TAPE CARTRIDGE FOR USE IN A TAPE RECORDER

Filed Dec. 4, 1967 5 Sheets-Sheet 4

INVENTOR

TSUNEHISA OHIRA

BY Stevens, Davis, Miller & Mosher

ATTORNEYS

INVENTOR
TSUNEHISA OHIRA

BY Stevens, Davis, Miller & Mosher
ATTORNEY

United States Patent Office 3,458,158

Patented July 29, 1969

3,458,158

DEVICE FOR DETACHABLY MOUNTING A TAPE CARTRIDGE FOR USE IN A TAPE RECORDER

Tsunehisa Ohira, Sagamihara, Japan, assignor to Victor Company of Japan, Limited, Yokohama, Japan Filed Dec. 4, 1967, Ser. No. 687,737
Claims priority, application Japan, Dec. 2, 1966, 41/109,738; Jan. 11, 1967, 42/1,771
Int. Cl. G11b 15/18; B65h 19/08
U.S. Cl. 242—198 4 Claims

ABSTRACT OF THE DISCLOSURE

A device for detachably mounting a tape cartridge for use in a tape recorder having a locking slide plate adaped to effect changed over operations by means of a push button and to keep the push button in the pushed state, a tape cartridge holder adapted to be pushed in the tape recorder in substantially horizontal position with the tape cartridge mounted thereon in case of mounting the tape cartridge in the tape recorder and pushed upwards above the tape recorder to an inclined position in case of removing the tape cartridge out of the tape recorder, said locking slide plate being provided with a shallow notch adapted to be positioned in opposition to a step push button when push buttons other than the stop push button are pushed downwards so as to restrict the downward movement of the stop push button and provided further with a deep notch adapted to be positioned in opposition to the stop push button when all of the push buttons are not pushed downwards so as to allow a free downward movement of the stop push button and hence to operate said tape cartridge holder, and means for pushing upwards said tape cartridge holder when the latter is freely pushed downwards.

The present invention relates to a tape recorder and more particularly to a device for detachably mounting a tape cartridge for use in a tape cartridge type tape recorder.

A tape cartridge type tape recorder adapted to use a cartridge with a magnetic tape and its winding means incoropated therein is capable of driving the magnetic tape in the cartridge when the latter is brought into engagement with a capstan, a reel driving shaft etc.

In case of detachably mounting the tape cartridge on the tape recorder it is necessary to locate the tape cartridge at a given position and then push the upper surface of the tape cartridge, with the result that the tape cartridge makes contact with projection on the capsan, the reel driving shaft etc. thus making the mounting of the tape cartridge difficult.

In case of removing the tape cartridge from the tape recorder the tape cartridge must be held at its each side surface by fingers so as to bring it upwards in parallel with the tape recorder, thereby making the removal of the tape cartridge from the tape recorder not simple.

Heretofore, it has been proposed to provide a push button or a lever adapted to be used for removing the tape cartridge from the tape recorder, but the addition of such push button or lever has the disadvantage that the tape recorder becomes expensive and large in size, and that some location of the push button or lever makes it difficult to operate them.

In order to obviate the above mentioned disadvantages, the invention provides a way of detachably mounting a tape cartridge on a tape recorder such that in case of mounting the tape cartridge on the tape recorder said tape cartridge is kept at an inclined position thus mounting the cartridge on the tape recorder by slightly pushing downwards the upper surface of the cartridge and that in case of removing the tape cartridge from the tape recorder a stop or removing push button adapted to be changed over by push buttons is pushed downwards to cause the tape cartridge to be pushed upwards with the aid of a member interlocked with said push button and thus pushing upwards the tape cartridge and keeping it in its inclined position.

An object of the invention, therefore, is to provide an improved device for detachably mounting a tape cartridge for use in a tape recorder, and which is particularly adapted to be constructed so as to effect the detachable mounting of the tape cartridge in an easy manner.

Another object of the invention is to provide such an improved device for detachably mounting a tape cartridge for use in a tape recorder adapted to be changed over by push buttons, which is capable of removing the tape cartridge from the tape recorder with the aid of a stop push button.

Another object of the invention is to provide such an improved device for detachably mounting a tape cartridge for use in a tape recorder, which is simple in construction and can effect the detachable mounting operation of the tape cartridge in a positive manner.

Yet another object of the invention is to provide such an improved device for detachably mounting a tape cartridge for use in a tape recorder, which is capable of opening and closing a lid in case of effecting the detachable mounting of the tape cartridge.

Other objects, features and advantages of the invention will become apparent from a consideration from the following specification, when the specification is considered in conjunction with the accompanying drawing, which illustrates:

FIGS. 5 to 7 are front elevations illustrating different operated positions of a push button mechanism; in which FIG. 5 shows a reproducing position, FIG. 6 a stop position and FIG. 7 a position where a tape cartridge is removed from a tape recorder;

Figure 8:
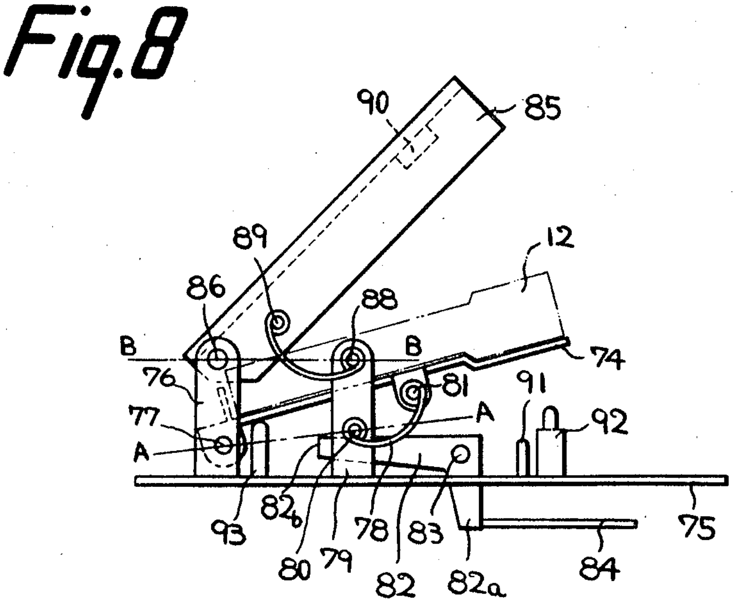
Figure 9:
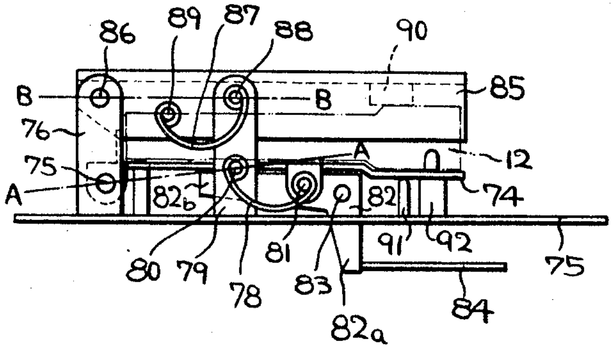
Figure 10:
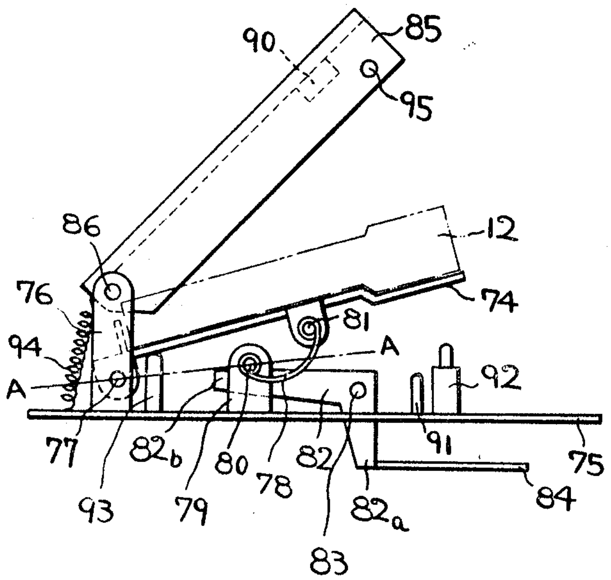

FIGS. 8 and 9 show another embodiment of the device according to the invention, in which FIG. 8 is a side elevation illustrating a position where the tape cartridge is removed from the tape recorder and FIG. 9 is a side elevation illustrating a position where the tape cartridge is mounted in the tape recorder; and FIG. 10 is a side elevation of a further embodiment of the device according to the invention illustrating a position where the tape cartridge is removed from the tape recorder.

In the following description with reference to the drawing the same reference numerals are used to designate the same parts.

Figure 1:
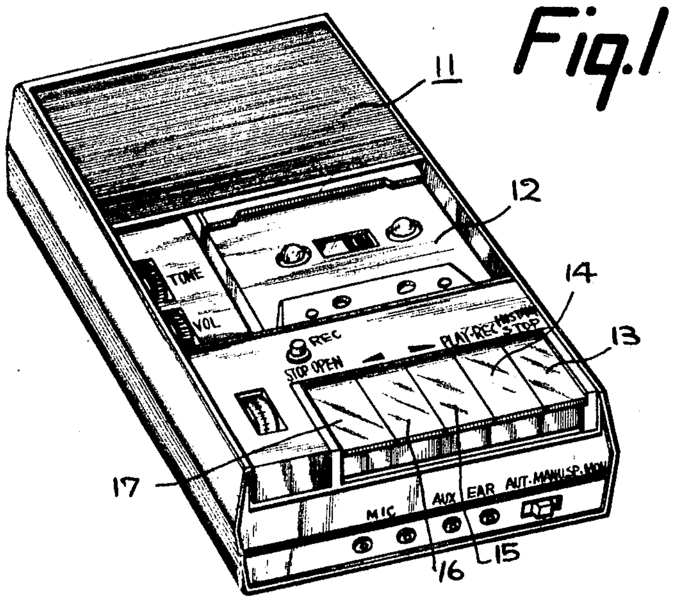
FIG. 1 is a perspective view of a tape recorder incorporated with a device according to the invention.
Figure 2:
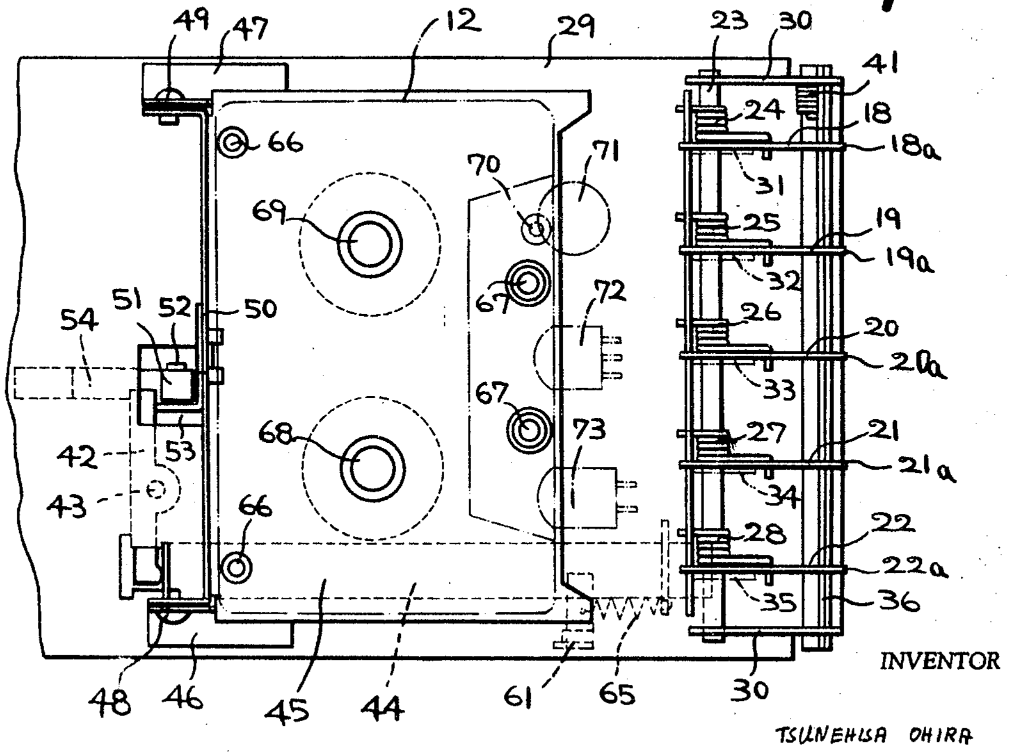
FIG. 2 is its plan view illustrating essential parts of an internal mechanism.

Referring to FIG. 1, 11 designates a tape recorder having means for driving a conventional magnetic tape, means for recording and reproducing the magnetic tape, an amplifier, a sound reproducing body, means for changing over various operations, and means for detachably mounting a tape cartridge to be described later. 12 is a tape cartridge with a magnetic tape and means for winding it incorporated therein. 13 designates a stop push button, 14 a reproducing push button, 15 a quick feed push button, 16 a feed back push button, and 17 a stop or tape cartridge removing push button.

A mechanism for detachably mounting the tape cartridge on the tape recorder and the operation thereof will now be explained with reference to FIGS. 2 to 7.

Referring to FIGS. 2, 18, 19, 20, 21 and 22 designate push button levers spaced apart by a given distance one from the other along a push button shaft 23 and rotatably mounted thereon. 18 is a temporary stop lever, 19 a reproducing lever, 20 a quick feed lever, 21 a feed back lever, and 22 a stop or tape cartridge removing lever, these levers being urged upwards by the action of springs 24, 25, 26, 27 and 28, respectively. The push button shaft 23 is supported by brackets 30 secured to a base plate 29. Each of the above mentioned push button levers 18, 19, 20, 21 and 22 is formed into substantially L-shape and one of the two arms **18*a*, 19*a*, 20*a*, 21*a*, and 22*a* of these levers being provided on the above mentioned push buttons 13, 14, 15, 16 and 17, respectively. Pushing downwards movement of these push buttons causes the push button levers 18, 19, 20, 21 and 22 to rotate against the actions of the springs 24, 25, 26, 27 and 28** respectively.

The other arms **18*b*, 19*b*, 20*b*, 21*b* and 22*b* extend downwards through slots 31, 32, 33, 34 and 35 formed at the base plate 29 and the bracket 31**, the slot restricting the degree of rotation of each push button lever.

Figure 7:
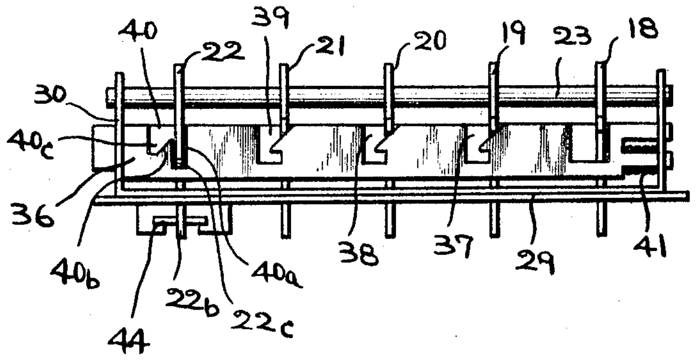

The arms **18*a*, 19*a*, 20*a*, 21*a* and 22*a* of the push button levers are terminated at fork-shaped ends which form two claws. One of these two claws 18*c*, 19*c*, 20*c* and 22*c* is adapted to be engaged with a locking slide plate 36. This slide plate 36 is provided in opposition to the claws 19*c*, 20*c* and 21*c* of the reproducing push button lever 19, the quick feed push button lever 20 and the feed back push button lever 21, respectively, with notches 37, 38 and 39 consisting of inclined surfaces 37*a*, 38*a* and 39*a* and hooks 37*b*, 38*b* and 39*b*. The stop push button 22 is provided in opposition to its claw 22*c* with a deep notch 40*a* and a notch 40 adjacent to the deep notch 40*a* and consisting of an inclined surface 40*b* and a shallow notch 40*c*. The locking slide plate 36 is slidably supported by the brackets 30, 30 and normally biased by a spring 41** to the left as shown in FIG. 7.

At the back of the stop push button lever 22 is arranged a cartridge removing lever 42 rotatably pivoted at its intermediate part by a shaft 43. Between the arm **22*b* of the stop push button lever 22 and the cartridge removing lever 42 is slidably supported a slide lever 44 adapted to be operated by the push button lever 22 so as to rotate the cartridge removing lever 42**.

Figure 3:
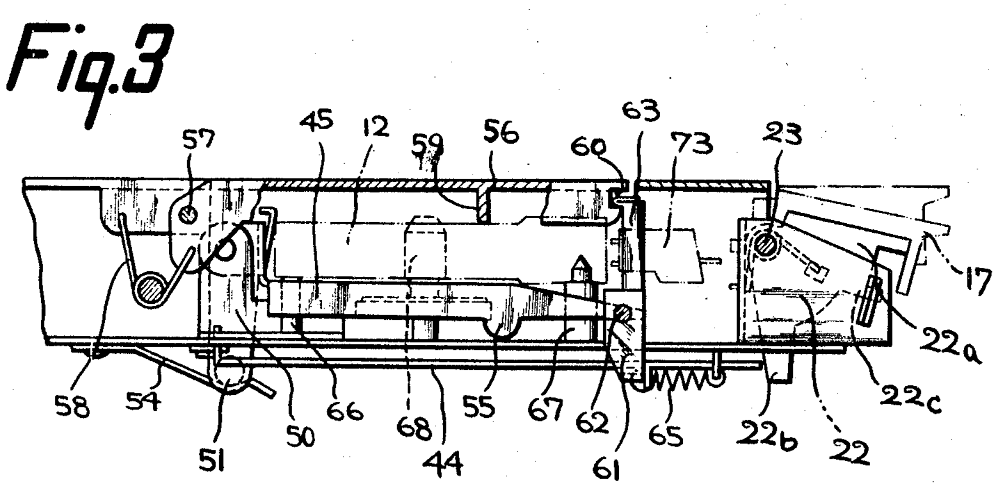
FIG. 3 is a side elevation of the essential parts shown in FIG. 2.

45 designates a cartridge holder adapted to be pushed upwards to its inclined position in case of mounting and removing the tape cartridge 12. The rear end of the cartridge holder 45 is rotatably pivoted at its both sides by shafts 48 and 49 secured to brackets 46 and 47 projected from the base plate 29. At substantially intermediate part of these two pivoted portions is secured one end of a lever 50 whose free end is provided with a shaft 52 adapted to rotatably support a roller 51. This free end of the lever 50 extends downwards through a hole 53 formed on the base plate 29 and becomes in engagement with the cartridge removing lever 42. 54 is a leaf spring having a shape as shown in FIG. 3 and whose one end is secured to the base plate 29 and urged normally against the roller 51 of the lever 50. 55 is a stopper projected from the cartridge holder 45 and serves to hold the cartridge holder 45 in its horizontal position.

56 designates a lid molded from a transparent synthetic resin etc. and rotatably pivoted at its rear end by a shaft 57. The lid 56 is arranged above the cartridge holder 45 and normally biased to be opened by means of a spring 58. 59 is a projection provided inside the lid 56 and adapted to be brought into engagement with the tape cartridge 12 so as to prevent a displacement of the latter.

The lid 56 is provided at its front end with a groove 60 adapted to be engaged at substantially intermediate part thereof with one end of a lock lever 63 rotatably pivoted by a shaft 62 to a bracket 61 provided on the base plate 29 when the lid 56 is closed. The other end of the lock lever 63 extends downwards through the base plate 29 and makes engagement with a projection 64 of the slide lever 44. Between the other end of the lock lever 63 and the base plate 29 is arranged a spring 65 which serves normally to hold the lock lever 63 at its vertical position.

66 and 67 are guide rods for holding the cartridge holder 45 in substantially horizontal position at the given height thereof.

68 and 69 are reel driving shafts, 70 a capstan shaft, 71 a pinch roller, 72 an erasing head, and 73 a recording and reproducing head.

The operation of the above mentioned device according to the invention will now be explained.

Figure 4:
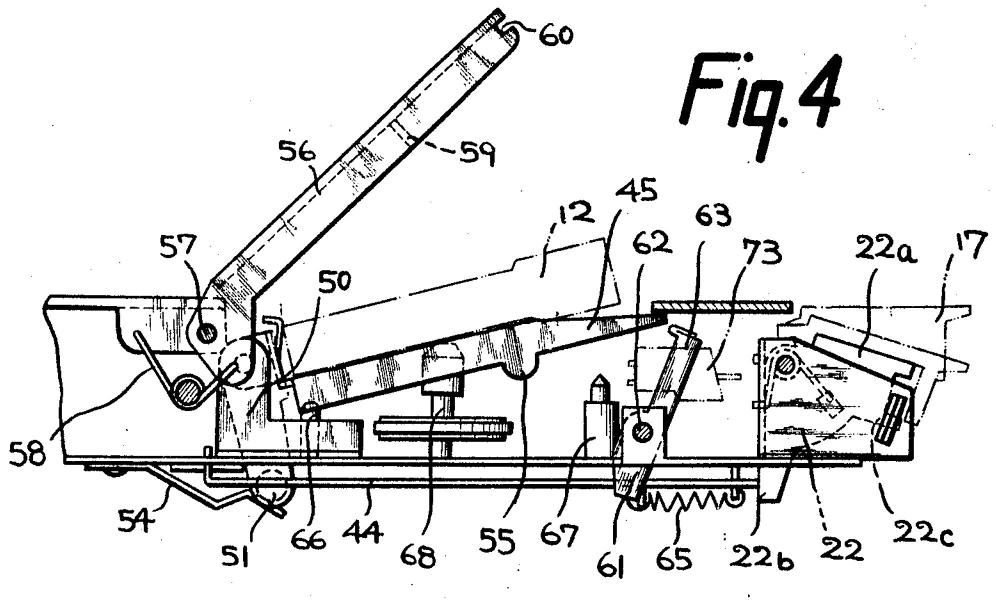
FIG. 4 is another plan view illustrating the essential parts shown in FIG. 2 in their operated position.
Figure 5:
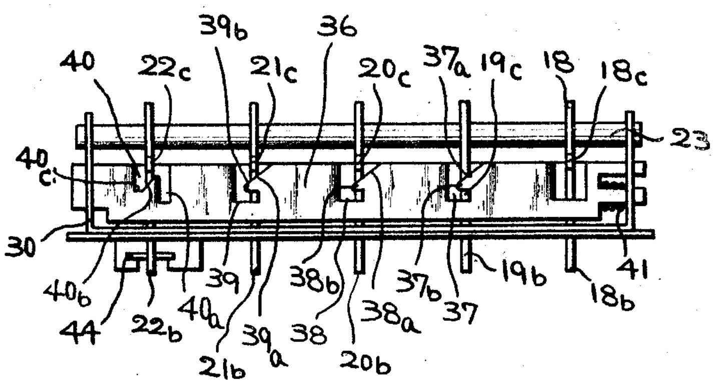

In case of mounting the tape cartridge 12 it is put on the cartridge holder 45 which is held together with the lid 56 in the inclined position shown in FIG. 4. Then, the lid 56 is pushed downwards by the finger to bring the projection 59 of the lid 56 into engagement with the upper part of the tape cartridge 12 thus preventing the displacement of the cartridge 12. Subsequently, the lid 56 is further pushed downwards to locate the tape cartridge 12 and the cartridge holder 45 in substantially horizontal position thereof. The cartridge holder 45 is held in substantially horizontal position at its given height by the action of the leaf spring 54 with the aid of the stopper 55 and the guide rods 66 and 67, while the groove 60 provided at the front end of the lid 56 makes engagement with the lock lever 63 to hold the lid 56 in its closed position.

After the tape cartridge 12 has been mounted the reproducing push button 14 is pushed downwards to rotate the reproducing push button lever 19. Then, the claw **19*c* causes the inclined surface 37*a* of the locking slide plate 36 to push downward thereby moving the slide plate 36 to the right against the action of the spring 41. Thus, the claw 19*c* is rought into engagement with the hook 37*b* of the locking slide plate 36 to lock the reproducing push button 19** in the rotated position, with the result that the tape recorder is maintained at its reproducing state (refer to FIG. 5).

In this reproducing state, if the quick feed push button lever 20 or the feed back push button lever 21 is made rotated the locking slide plate 36 is moved to the right and then makes engagement with this new lever 20 or 21. This causes the reproducing push button lever 19 to be released from its locked state and hence brought back into its original position by the action of the spring 25.

Figure 6:
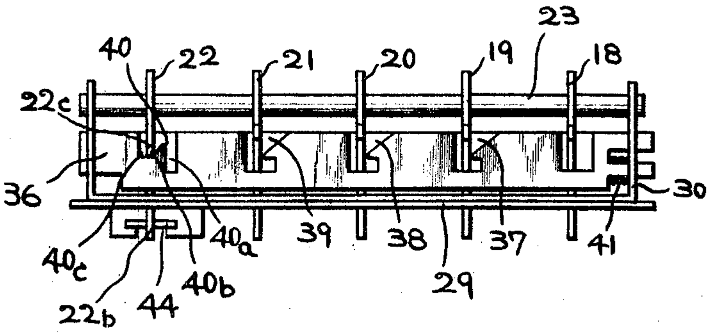

In order to change over the above mentioned state to the stop state, the stop push button lever 22 is made rotated to urge its claw **22*c* against the inclined surface 40*b* of the locking slide plate 36. Thus, the claw 22*c* is inserted into the shallow notch 40*c* to move the slide plate 36 to the right as shown in FIGS. 3 and 6, with the result that the reproducing push button lever 19 which has been locked by the hook 37*b* of the slide plate 36 is released and returned to its original position. In this case, the amount of rotation of the stop push button lever 22 is restricted by the shallow notch 40*c* of the locking slide plate 36 so that the arm 22*b* of the stop push button lever 22 is not rotated in the amount sufficient to rotate the cartridge removing lever 42 but rotated in such an extent that the space formed between the slide lever 44 at one hand and the arm 22*b* and the cartridge removing lever 42 at another hand becomes shortened. However, in this state if the stop push button lever 22 is rotated again the tape cartridge 12 is brought into its removable state as shown in FIGS. 4 and 7. In case of rotating the stop push button lever 22 again the locking slide plate 36 has been located in its rest position shown in FIG. 7 so that the claw 22*c* of the stop push button lever 22 is now inserted into the deep notch 40*a*, with the result that the stop push button lever 22 is capable of rotating in such a degree that its arm 22*b* causes rotation of the cartridge removing lever 42 and the lock lever 63 through the slide lever 44 to bring the cartridge holder 45 and the lid 56 into the inclined position thereof and hence the tape cartridge 12** becomes its removable state.

FIGS. 8 and 9 show another embodiment of the device according to the invention. 74 is a cartridge holder adapted to be pushed upwards to its inclined position when the tape cartridge 12 is mounted and removed. The rear end portion of the cartridge holder 74 is rotatably pivoted by a shaft 77 to a bracket 76 projected from a base plate 75. 78 is a spring capable of pushing upwards the cartridge holder 74 to its inclined position or pushing downwards it to its substantially horizontal position. One end of the spring 78 is supported by a fulcrum 80 of a spring holding bracket 79 projected from the base plate 75 while the other end of the spring 78 is supported in precompressed state by a fulcrum 81 of the cartridge holder 74. If the cartridge holder 74 is pushed upwards such that its fulcrum 81 is positioned above a line A—A passing through the pivot 77 and the fulcrum 80 as shown in FIG. 8, the spring 78 serves to hold the cartridge holder 74 in the position shown in FIG. 8 with the aid of the stopper (not shown).

82 is a cartridge removing lever formed into substantially L-shape and arranged below the cartridge holder 74. The cartridge removing lever 82 is rotatably pivoted at its intermediate portion to a shaft 83. If one end **82*a* of the lever 82 is pushed to the left by a slide lever 84, the other end 82*b* is moved upwards to push upwards the cartridge holder 74 in its inclined position. 85 is a lid for covering the tape cartridge 12. The rear end of the lid 85 is rotatably pivoted by means of a shaft 86 to the upper part of the bracket 76. 87 is a spring capable of holding the lid 85 in its open state or in its closed state. One end of the spring 87 is supported by a fulcrum 88 secured to the upper part of a bracket 79 while the other end of the spring 87 is supported by a fulcrum 89 secured to the lid 85 in its precompressed state. If the fulcrum 89 is raised to a position above a line B—B passing through the pivot 86 and the fulcrum 88 as shown in FIG. 8, the spring 87 then serves to hold the lid 85 in its open position. If the lid 85 is pushed downwards as shown in FIG. 9, a projection 90 from the lid 85 is brought into contact with the tape cartridge 12 to prevent the displacement of the tape cartridge 12. If the lid 85 is further pushed downwards, the tape cartridge 12 and the cartridge holder 74 are pushed downwards to substantially horizontal positions thereof. In this case the fulcrums 81 and 89 are pushed downwards below the lines A—A and B—B, respectively, and then the spring 78 serves to urge the cartridge holder 74 against a stopper 91 and thus the cartridge holder 74 is held in substantially horizontal position at a given height with the aid of guide rods 92 and 93. A spring 87 serves to hold the lid 85 in its closed position. Provision is made of a slide lever which is slidable in the same manner as that shown in the first embodiment. If one end 82*a* of the cartridge removing lever 82 is pushed by the slide lever 84, the lever 82 becomes rotated to push upwards the cartridge holder 74 by means of the other end 82*b*. Thus, the fulcrum 81 assumes a position above the line A—A and hence the spring 78 causes the cartridge holder 74 to push upwards in its inclined position shown in FIG. 8. Thus, the cartridge holder 74 is held in its inclined position. At the same time the fulcrum 89 of the lid 85 is pushed upwards above the line B—B and then the spring 87 serves to hold the lid 85** in its opened position.

FIG. 10 shows a further embodiment of the device according to the invention. The present embodiment does not make use of the spring 87 for the purpose of holding the lid 85 in its open and closed positions as in the above mentioned embodiments, but makes use of a spring 94 capable of pulling downwards the rear end of the lid 85 rotatably pivoted by the shaft 86 and holding the lid 85 in its open position. In case of closing the lid 85, a projection 95 therefrom is brought into engagement with a recess formed in the tape recorder body to hold the lid 85 in its closed position.

It will be appreciated that the invention is not restricted to the embodiments described and that many variations are possible to a person skilled in the art without departing from the scope of the invention.

What is claimed is:

1. A device for detachably mounting a tape cartridge for use in a cartridge type tape recorder adapted to effect change over operations by means of push buttons, comprising a plurality of push buttons including a stop push button means for effecting change over operations adapted to stop a stop push button when push buttons other than the stop push button are pushed downwards and operate said stop push button as a tape cartridge removing button when all of the push buttons are not pushed downwards, means for holding a tape cartridge adapted to hold said tape cartridge in a substantially horizontal position in case of mounting the tape cartridge and hold said tape cartridge in an inclined position in case of removing the tape cartridge and means for pushing upwards a tape cartridge adapted to push upwards said tape cartridge holding means to the inclined position when said change over operating means assumes a tape cartridge removing position.

2. A device for detachably mounting a tape cartridge for use in a cartridge type tape recorder adapted to effect change over operations by means of push buttons, comprising a plurality of push buttons including a stop push button means for effecting change over operations adapted to stop a stop push button when push buttons other than the stop push button are pushed downwards and operate said stop push button as a tape cartridge removing button when all of the push buttons are not pushed downwards, means for holding a tape cartridge adapted to hold said tape cartridge in a substantially horizontal position in case of mounting the tape cartridge and hold said tape cartridge in an inclined position in case of removing the tape cartridge, means for covering a tape cartridge adapted to cover said tape cartridge holding means and to be operated in interlocked relation with said holding means, and means for pushing upwards a tap cartridge adapted to push upwards said tape cartridge holding means and tape cartridge cover means to the inclined position when said change over operating means assumes a tape cartridge removing position.

3. A device for detachably mounting a tape cartridge for use in a cartridge type tape recorder as claimed in claim 1, which further comprising a locking slide plate having a shallow notch arranged in opposition to the stop button of said change over operating means and adapted to restrict the amount of downward movement of the stop push button when push buttons other than the stop push button are pushed downwards and a deep notch arranged in opposition to the stop button of said change over operating means and adapted to permit a free downward movement of the stop push button when all of the push buttons are not pushed downwards.

4. A device for detachably mounting a tape cartridge for use in a cartridge type tape recorder as claimed in claim 2, which further comprising a locking slide plate having a shallow notch arranged in opposition to the stop button of said change-over operating means and adapted to restrict the amount of downward movement of the stop button when push buttons other than the stop button are pushed downwards and a deep notch arranged in opposition to the stop button of said change over operating means and adapted to permit a free downward movement of the stop push button when all of the push buttons are not pushed downwards.

References Cited

UNITED STATES PATENTS

| | | | |
|---|---|---|---|
| 3,146,316 | 8/1964 | Knoth | 242—55.13 X |
| 3,167,267 | 1/1965 | Crane | 242—55.13 |
| 3,385,534 | 5/1968 | Staar | 242—55.13 |
| 3,394,898 | 7/1968 | Laa | 242—55.13 |

LEONARD D. CHRISTIAN, Primary Examiner